(12) United States Patent
Mochizuki

(10) Patent No.: US 6,628,611 B1
(45) Date of Patent: Sep. 30, 2003

(54) TRAFFIC CONTROL SYSTEM AND METHOD FOR CONSTANT-RATE AND VARIABLE-RATE MODES OF TRANSMISSION

(75) Inventor: Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/457,520

(22) Filed: Dec. 9, 1999

(30) Foreign Application Priority Data

Dec. 10, 1998 (JP) .......................................... 10-351521

(51) Int. Cl.⁷ .......................... H04L 12/01; H04L 12/26
(52) U.S. Cl. ........................ 370/229; 370/235; 370/465
(58) Field of Search ................................. 370/335, 329, 370/341, 342, 328, 464, 465, 431, 441, 229, 235, 232

(56) References Cited

U.S. PATENT DOCUMENTS

| | | | |
|---|---|---|---|
| 5,943,316 A | * 8/1999 | Davis | 370/232 |
| 6,005,852 A | * 12/1999 | Kokko et al. | 370/329 |
| 6,185,187 B1 | * 2/2001 | Ghanwani et al. | 370/232 |
| 6,215,793 B1 | * 4/2001 | Gultekin et al. | 370/465 |
| 6,330,233 B1 | * 12/2001 | Miya et al. | 370/342 |
| 6,421,335 B1 | * 7/2002 | Kilkki et al. | 370/342 |

FOREIGN PATENT DOCUMENTS

| | | |
|---|---|---|
| JP | 63-161740 | 7/1988 |
| JP | 63-236445 | 10/1988 |
| JP | 7-303117 | 11/1995 |
| JP | 9-18848 | 1/1997 |
| JP | 10-107769 | 4/1998 |
| JP | 11-17646 | 1/1999 |
| JP | 11-163830 | 6/1999 |

OTHER PUBLICATIONS

Japanese Office Action, dated Dec. 27, 2000, with English language translation of Japanese Examiner's comments.

* cited by examiner

Primary Examiner—Ajit Patel
Assistant Examiner—Chirag Shah
(74) Attorney, Agent, or Firm—Whitham, Curtis & Christofferson, P.C.

(57) ABSTRACT

In a communication system, a first transfer rate is assigned to a first user terminal requesting a variable-rate mode of transmission and a second transfer rate is subsequently assigned to a second user terminal requesting a constant-rate mode of transmission if the second transfer rate is equal to or smaller than a remaining capacity of the transmission link. If the second transfer rate is greater than the remaining link capacity, a third transfer rate lower than the first transfer rate is assigned to the first user terminal so that the remaining link capacity is increased. The second transfer rate is assigned to the second user terminal if it is equal to or smaller than the increased remaining link capacity. Preferably, if the communication system is a CDMA system, a first spreading code is assigned to the first user terminal as an indication of the first transfer rate and a second spreading code is reassigned as an indication of the third transfer rate with the first and second spreading codes being hierarchically organized as higher and lower layers, respectively.

2 Claims, 2 Drawing Sheets

TRAFFIC CONTROL SYSTEM AND METHOD FOR CONSTANT-RATE AND VARIABLE-RATE MODES OF TRANSMISSION

BACKGROUND OF THE INVENTION

1. Field of the Invention

The present invention relates generally to communication systems, and more specifically to a traffic control system and method for efficient utilization of transmission link resource for transmission of real-time signals in a constant-rate mode and packets in a variable-rate mode.

2. Description of the Related Art

In communication systems, two transmission modes are available. One is a constant-rate transfer mode for real-time services in which latency is impermissible, such as voice and facsimile signals. The other is a variable-rate transfer mode where some latency is allowed, such as packets. In a mixed mode of transmissions, call requests are treated equally for both types of transmission so that if the transmission link is full to its capacity, request from a new cell is rejected. In other mixed modes of transmission, priority is given to the constant-rate mode so that when the usage rate of the transmission link exceeds some critical value, all call requests for variable-rate mode of transmission are rejected.

A similar traffic control system is disclosed in Japanese Laid-Open Patent Application 10-107769. According to this prior art, the total traffic volume of user terminals of a first service category is measured at periodic intervals and the measured volume is subtracted from the system's maximum capacity. If there is a remaining capacity, a portion (transmission rate) or whole of it is assigned to user terminals of a second service category. However, in this prior art assignment system the transfer rate of a packet call is maintained constant for the duration of the call. Thus, the transmission link resource is not utilized to the fullest extent for a mixed mode of transmissions.

SUMMARY OF THE INVENTION

Because of the bursty nature of packet transmission, the present invention is based on the utilization of a transmission link by lowering the transfer rate of a packet to vacate a portion of the link resource for calls of constant-rate transfer mode when congestion occurs on the link.

It is therefore an object of the present invention to provide a communication system for efficient utilization of transmission link resource for variable-rate and constant-rate modes of transmission.

In a first aspect, the present invention provides a communication system comprising control circuitry for assigning a first transfer rate to a first user terminal requesting a variable-rate mode of transfer over a transmission link and subsequently assigning a second transfer rate to a second user terminal requesting a constant-rate mode of transfer over the transmission link if the second transfer rate is equal to or smaller than a remaining capacity of the transmission link. The control circuitry reassigns a third transfer rate lower than the first transfer rate to the first user terminal if the second transfer rate is greater than the remaining link capacity so that the remaining link capacity is increased. If the second transfer rate is equal to or smaller than the increased remaining link capacity, the control circuitry assigns the second transfer rate to the second user terminal.

Preferably, the communication system is a code division multiple access system and the control circuitry is arranged to assign a first spreading code to the first user terminal as an indication of the first transfer rate and reassign a second spreading code to the first user terminal as an indication of the third transfer rate, the first and second spreading codes being hierarchically organized as higher and lower layers, respectively, and the second spreading code being longer than the first spreading code.

In a second aspect, the present invention provides a method of controlling transfer rates. According to the method, a first transfer rate is assigned to a first user terminal requesting a variable-rate mode of transfer over a transmission link. A second transfer rate is subsequently assigned to a second user terminal requesting a constant-rate mode of transfer over the transmission link if the second transfer rate is equal to or smaller than a remaining capacity of the transmission link. If the second transfer rate is greater than the remaining link capacity, a third transfer rate lower than the first transfer rate is reassigned to the first user terminal to increase the remaining link capacity. The second transfer rate is assigned to the second user terminal if it is equal to or smaller than the increased remaining link capacity.

In a still further aspect, the present invention provides a method of controlling transfer rates comprising the steps of (a) assigning a first transfer rate to a first user terminal in response to a call request from the first user terminal requesting a variable-rate mode of transfer over a transmission link, (b) defining a relationship between identity of the first user terminal, an indication of the variable-rate mode of transfer and the assigned first transfer rate in a first entry of a memory, (c) determining from contents of the memory a remaining capacity of the transmission link in response to a call request from a second user terminal requesting a constant-rate mode of transfer over the transmission link and comparing the remaining link capacity with a second transfer rate requested by the second user terminal, (d) if the second transfer rate is equal to or smaller than the remaining link capacity, assigning the second transfer rate to the second user terminal, (e) defining a relationship between the identity of the second user terminal, an indication of the constant-rate mode of transfer and the assigned second transfer rate in a second entry of the memory, (f) if the second transfer rate is greater than the remaining link capacity, making a search through the memory for an entry containing a user terminal whose mode of transfer is variable rate and whose transfer rate can be reduced, (g) if the entry is detected by the step (f), reassigning a third transfer rate lower than the first transfer rate to the first user terminal and updating the first entry of the memory and returning to the step (c). If the entry is note detected by the step (f), the request from the second user terminal is rejected.

BRIEF DESCRIPTION OF THE DRAWINGS

The present invention will be described in further detail with reference to the accompanying drawings, in which.

DETAILED DESCRIPTION

Figure 1:
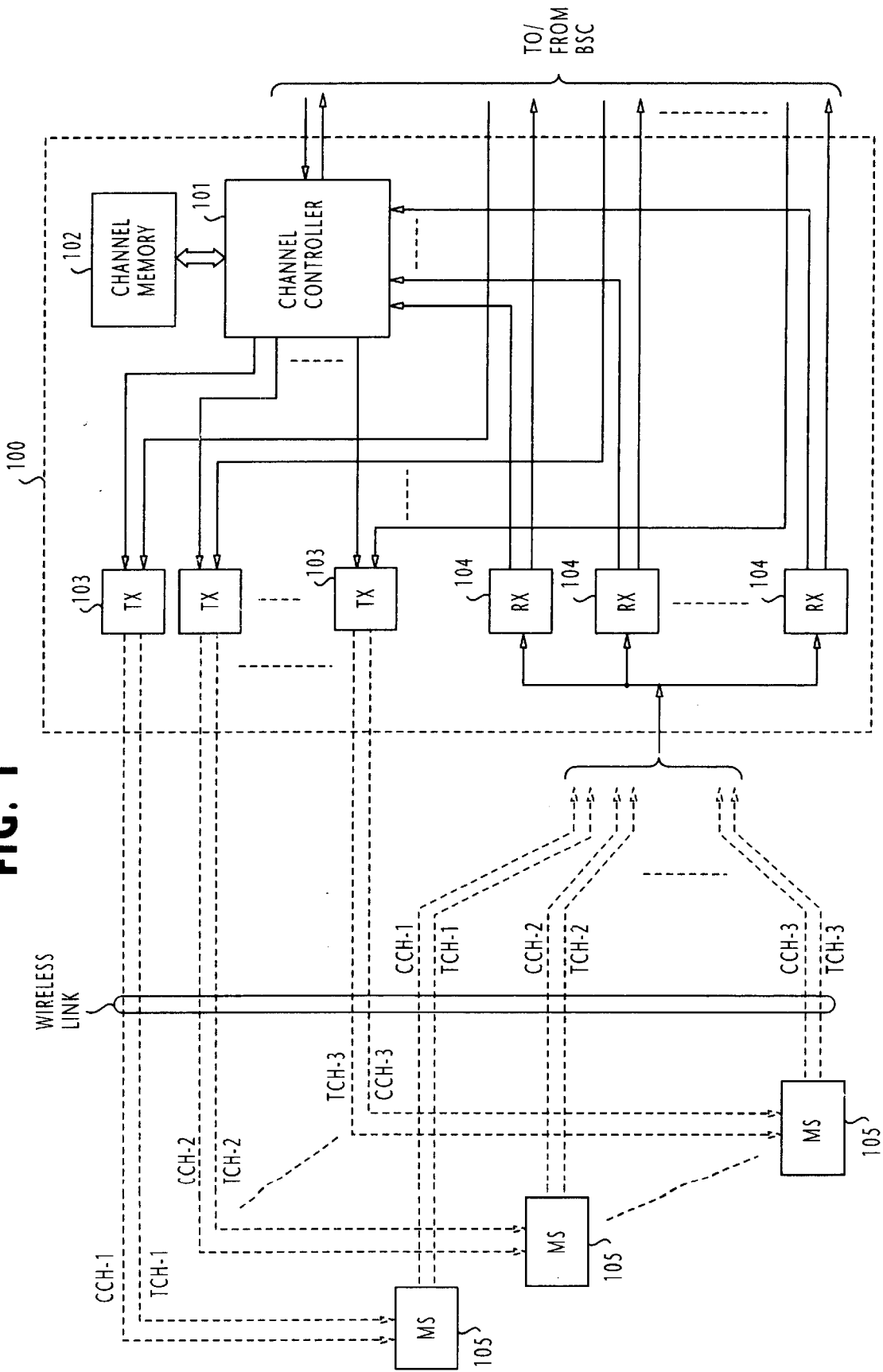
FIG. 1 is a block diagram of a CDMA cellular communication system, showing details of a base station and a plurality of user terminals.

Referring now to FIG. 1, there is shown a CDMA (code division multiple access) cellular communication system, which includes a plurality of base stations. For simplicity, only one base station 100 is illustrated. Base station 100 is connected to a mobile switching center via a base station controller (BSC), not shown, by way of which other base stations are also connected to the mobile switching center. Base station 100 comprises a channel controller 101 connected to the base station controller to exchange control signals. A plurality of transmitters 103 are provided for transmission of control signals over downlink wireless control channels (CCH) and traffic signals over downlink wireless traffic channels (TCH) to a plurality of mobile stations, or user data terminals 105. A plurality of receivers 104 are respectively associated with the mobile stations to receive control signals and traffic signals from the associated mobile stations over uplink wireless control channels and uplink wireless traffic channels.

All wireless channels are illustrated by dotted lines as logical channels which are portions of a wireless link that can be established between the base station 100 and a maximum number of mobile stations 105. The transfer rate of each traffic channel thus occupies a portion of the total capacity of the wireless link that can be shared by all mobile stations of the base station for transmission of traffic signals.

The transfer rates of all established traffic channels are stored in a channel memory 102. Channel controller 101 monitors the uplink control signals from the receivers 104 as well as the downlink control signals from the base station controller to examine the contents of the channel memory 102 to assign a transfer rate to the call request and controls one of the transmitters 103 to establish a traffic channel.

As will be described below, the channel controller 101 performs assignment of a transfer rate in response to receipt of a packet (variable-rate) call and reassignment of a transfer rate to a packet call in response to receipt of a constant-rate call for digital telephone or facsimile signals in accordance with the contents of the channel memory 102.

Figure 2:
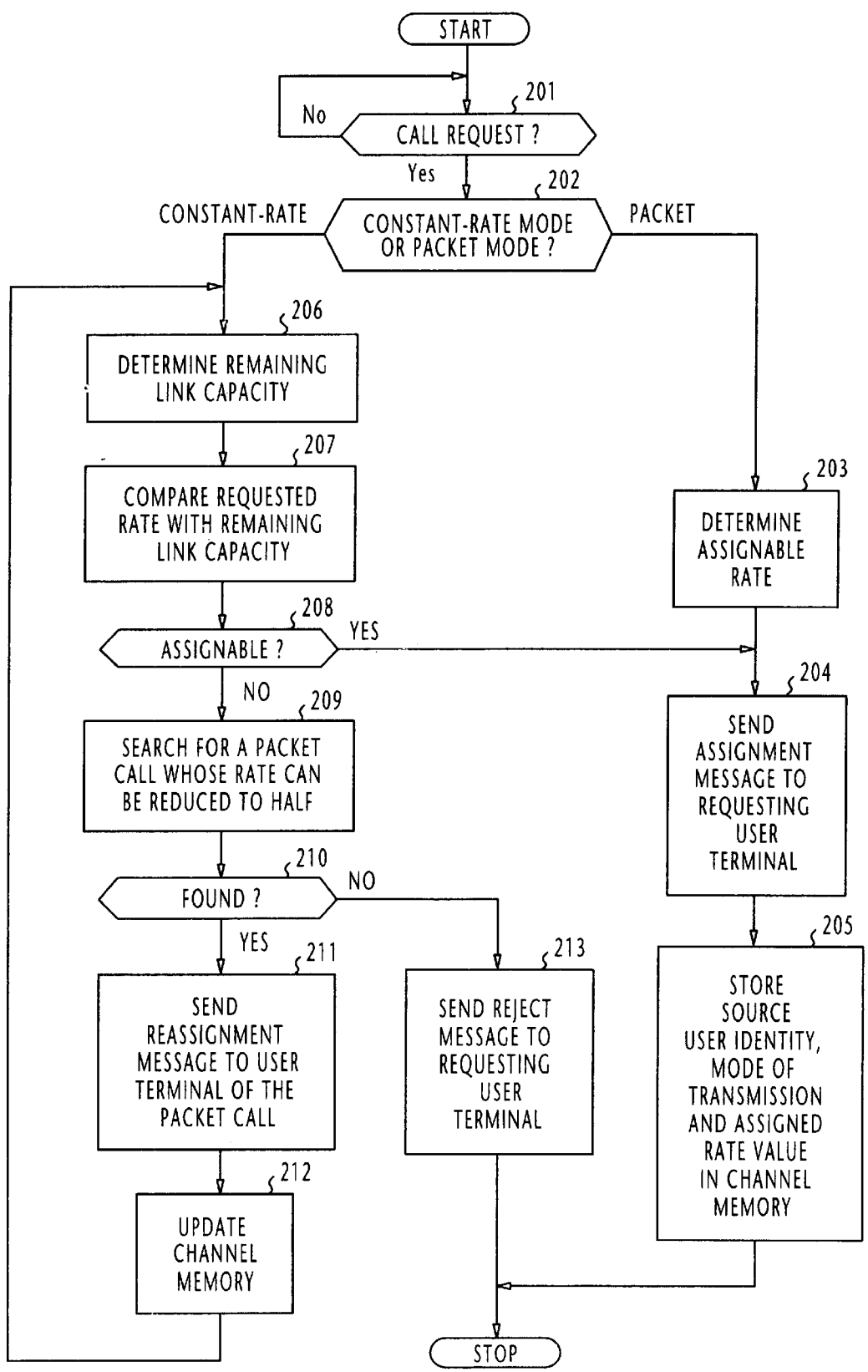
FIG. 2 is a flowchart of the operation of the channel controller of FIG. 1.

In FIG. 2, the operation of the channel controller 101 is illustrated in a sequence of programmed steps. When a call request is received from one of the receivers 104 or from the base station controller (step 201), the channel controller 101 determines whether the call is in a variable-rate mode for transmission of packets or a constant-rate mode for transmission of a real-time digital signal (step 202).

If the call is requesting a packet mode of transmission, the routine proceeds from step 22 to step 203 to examine the contents of the channel memory 102 to determine the remaining capacity of the wireless link of the base station 100 and assigns a portion of the remaining capacity to the call as a transfer rate of the packet.

At step 204, the channel controller 101 directs an appropriate transmitter 103 to establish a downlink wireless traffic channel to a destination user terminal and informs the requesting source user terminal of the assigned value of transfer rate. At step 205, the controller stores the source terminal identity, the variable-rate mode indication and the value of transfer rate assigned to the source user terminal in one entry of the channel memory 102, and proceeds to the end of the routine.

If the call is requesting a constant-rate mode of transmission, the routine proceeds from step 202 to step 206 to examine the contents of the channel memory 102 to determine the remaining capacity of the wireless transmission link of base station 100. At step 207, the controller compares the requested rate of the constant-rate transmission mode with the remaining link capacity.

If the requested rate is equal to or smaller than the remaining link capacity, it is determined that the requested rate can be assigned to the source user terminal (step 208) and the controller proceeds to step 204 to send an assignment message for indicating the assigned rate of transmission. If the call request is originated from a mobile user terminal, the assignment message is transmitted through an appropriate transmitter 103 and if the call request is received from the network, the assignment message is sent to the base station controller. At step 205, the controller stores the source terminal identity, the constant-rate mode indication and the transfer rate value assigned to the source user in one entry of the channel memory 102, and proceeds to the end of the routine.

If the decision at step 208 is negative, the controller proceeds to step 209 to search through the channel memory 102 for an entry containing a user terminal whose transmission is in packet mode and whose transfer rate can be reduced to one half of the currently assigned rate.

If such an entry is found in the channel memory 102 (step 210), the controller proceeds to step 211 to send a reassignment message to the packet-mode user terminal to reduce its transfer rate to one half of its current rate. At step 212, the channel controller 102 updates the packet-mode user entry of the channel memory 102 to the altered value and returns to step 206 to repeat the search for the next packet-mode user terminal.

In this way, steps 206 to 212 are repeatedly executed. This repeated process will continue until the remaining link capacity is increased to such an amount that the requested rate of the constant-rate mode transmission is assigned at step 208 or until the remaining link capacity cannot be increased as such and a negative decision is made when step 210 is executed. In the latter case, the controller proceeds from step 210 to step 213 to send a reject message to the requesting user terminal indicating that the request for a constant-rate mode transmission is not accepted, and terminates the routine.

In a CDMA communication network where spreading codes are hierarchically organized, the reduction of a transfer rate is achieved to advantage by reassigning a new spreading code having a longer bit length than the current spreading code. In the hierarchical structure, the longer-length spreading code sits one layer below the layer of the current spreading code. For example, if the current spreading code of a packet-mode user terminal is "1001", the user may be reassigned a longer spreading code "10011001" or "10010110" without loss of orthogonality to other calls. Therefore, the transfer rate can be decreased by a factor 1/N by extending the code length of the spreading code by a factor N. Details of hierarchically organized spreading codes are described in IEICE Transactions on Communications, Vol. E-81-B, No. 4 (April 1998), pages 777 to 784.

What is claimed is:

1. A traffic control method comprising the steps of:
    a) assigning a first transfer rate to a first user terminal in response to a call request from the first user terminal requesting a variable-rate mode of transfer over a transmission link;
    b) defining a relationship between identity of said first user terminal indication of said variable-rate mode of transfer and the assigned first transfer rate in a first entry of a memory;
    c) determining from contents of said memory a remaining capacity of said transmission link in response to a call request from a second user terminal requesting a constant-rate mode of transfer over the transmission link and comparing the remaining link capacity with a second transfer rate requested by the second user terminal;

d) if the second transfer rate is equal to or smaller than said remaining link capacity, assigning said second transfer rate to the second user terminal;

e) defining a relationship between identity of said second user terminal, indication of said constant-rate mode of transfer and the assigned second transfer rate in a second entry of said memory;

f) if said second transfer rate is greater than said remaining link capacity, making a search through said memory for an entry containing a user terminal whose mode of transfer is variable-rate and whose transfer rate can be reduced;

g) if said entry is detected by the step (f), reassigning a third transfer rate lower than the first transfer rate to said first user terminal and updating said first entry of said memory, and returning to the step (c); and h) if said entry is not detected by the step (f), rejecting the request from said second user terminal.

2. The traffic control method of claim 1, wherein the step (a) comprises assigning a first spreading code to said first user terminal as an indication of said first transfer rate and the step (g) comprises reassigning a third spreading code to said first user terminal as an indication of said third transfer rate, said first and second spreading codes being hierarchically organized as higher and lower layers, respectively, and said second spreading code being longer than said first spreading code.

* * * * *